United States Patent
Matsuzawa et al.

(10) Patent No.: US 9,360,312 B2
(45) Date of Patent: Jun. 7, 2016

(54) MEMS ELEMENT, ELECTRONIC DEVICE, ALTIMETER, ELECTRONIC APPARATUS, AND MOVING OBJECT

(71) Applicant: Seiko Epson Corporation, Tokyo (JP)

(72) Inventors: Yusuke Matsuzawa, Chino (JP); Yuji Chino, Suwa (JP)

(73) Assignee: Seiko Epson Corporation (JP)

( * ) Notice: Subject to any disclaimer, the term of this patent is extended or adjusted under 35 U.S.C. 154(b) by 190 days.

(21) Appl. No.: 14/097,526

(22) Filed: Dec. 5, 2013

(65) Prior Publication Data
US 2014/0157893 A1 Jun. 12, 2014

(30) Foreign Application Priority Data
Dec. 11, 2012 (JP) ................................. 2012-270078

(51) Int. Cl.
*G01C 5/06* (2006.01)
(52) U.S. Cl.
CPC ........................................ *G01C 5/06* (2013.01)
(58) Field of Classification Search
CPC ......... G01C 5/06; G01C 5/005; G01L 11/002
USPC .................................................. 73/384, 718
See application file for complete search history.

(56) References Cited

U.S. PATENT DOCUMENTS

| | | | |
|---|---|---|---|
| 4,523,474 A * | 6/1985 | Browne et al. | 73/724 |
| 2003/0209079 A1 | 11/2003 | Tsukada et al. | |
| 2005/0229710 A1 * | 10/2005 | O'Dowd et al. | 73/718 |
| 2007/0249082 A1 * | 10/2007 | Hanaoka et al. | 438/53 |
| 2011/0163397 A1 * | 7/2011 | Detor et al. | 257/415 |

FOREIGN PATENT DOCUMENTS

| | | |
|---|---|---|
| JP | 02-148768 | 6/1990 |
| JP | 2001-111062 A | 4/2001 |
| JP | 2001-332746 A | 11/2001 |
| JP | 2002-365152 A | 12/2002 |
| JP | 2003-329526 A | 11/2003 |
| JP | 2005-043159 A | 2/2005 |

* cited by examiner

*Primary Examiner* — Lisa Caputo
*Assistant Examiner* — Nathaniel T Woodward
(74) *Attorney, Agent, or Firm* — Harness, Dickey & Pierce, P.L.C.

(57) ABSTRACT

A MEMS element includes a substrate which includes a flexible portion, a fixation electrode which is provided on a principal surface of the substrate, and a movable electrode which includes a movable portion which is separated from the fixation electrode, overlaps with at least a portion of the fixation electrode in a plan view of the principal surface, and is driven in a direction intersecting the principal surface, and a fixation end connected to the principal surface. The fixation electrode and the movable electrode is disposed to correspond to the flexible portion.

7 Claims, 7 Drawing Sheets

MEMS ELEMENT, ELECTRONIC DEVICE, ALTIMETER, ELECTRONIC APPARATUS, AND MOVING OBJECT

BACKGROUND

1. Technical Field

The present invention relates to a Micro Electro Mechanical Systems (MEMS) element, an electronic device, an altimeter, an electronic apparatus, and a moving object.

2. Related Art

In the related art, as a device which detects pressure, a semiconductor pressure sensor disclosed in JP-A-2001-332746 is known. In the semiconductor pressure sensor disclosed in JP-A-2001-332746, a strain sensing element is formed on a silicon wafer, a surface opposite to a strain sensing element formation surface of the silicon wafer is polished, a diaphragm portion is formed by thinning the opposite surface, a strain sensing element detects strain generated in the diaphragm portion which is displaced by pressure, and the detection result is converted to pressure.

However, in the pressure sensor which includes the strain sensing element disclosed in JP-A-2001-332746, thinning of the silicon wafer is required, and thus, it is difficult to integrate the pressure sensor with a semiconductor device (IC) which becomes a calculation unit processing signal from the pressure sensor.

Meanwhile, semiconductor manufacturing methods and devices for manufacturing micro mechanical systems, so-called Micro Electro Mechanical Systems (MEMS) elements have attracted attention. Extremely small various sensors, oscillators, or the like can be obtained by using a MEMS element. In the sensors or the like, a minute vibration element is formed on a substrate using the MEMS technology, and thus, an element, which performs detection of acceleration, generation of a reference signal, or the like using vibration characteristics of the vibration element, can be obtained.

The vibration element is formed using MEMS technology, a pressure sensor, which detects pressure by variation of a vibration frequency of the MEMS vibration element, is configured, and thus, the pressure sensor which is integrated with the IC can be realized. Moreover, the thin diaphragm portion can be formed on a substrate and can be deformed even at low pressure, and thus, the MEMS element, which can configure the pressure sensor capable of correctly measuring minute pressure, is obtained.

SUMMARY

An advantage of some aspects of the invention is to solve at least a part of the problems described above, and the invention can be implemented as the following forms or application examples.

Application Example 1

This application example is directed to a MEMS element including: a substrate which includes a flexible portion; a fixation electrode which is provided on a principal surface of the substrate; and a movable electrode which includes a movable portion which is separated from the fixation electrode, overlaps with at least a portion of the fixation electrode in a plan view of the principal surface, and is driven in a direction intersecting the principal surface, and a fixation end connected to the principal surface. The fixation electrode and the movable electrode are disposed to correspond to the flexible portion.

According to this application example, bending is generated in the flexible portion by applying external pressure to the flexible portion, and a vibration characteristic of the resonator, that is, a resonant frequency is changed. By deriving a relationship between the external pressure and the change of the frequency characteristic of the resonator, the MEMS element can be used as a sensor which detects the external pressure from the change of the frequency characteristic of the resonator.

Application Example 2

This application example is directed to the MEMS element according to the application example described above, wherein a centroid of the flexible portion is positioned in a region, in which the fixation electrode and the movable electrode overlap with each other, in a plan view of the principal surface.

The region forming a gap (interval) between the fixation electrode and the movable electrode, which is one factor which determines the vibration characteristic of the resonator, is a region in which the fixation electrode and the movable electrode overlap with each other in the plan view of the principal surface. In this case, the flexible portion can be disposed so that a peak of the bending deformation of the flexible portion is positioned at the gap forming region, and it is possible to detect the change of the gap even when the pressure, which is an external load, is minute pressure and the bending amount of the flexible portion is extremely minute. That is, it is possible to obtain the MEMS element which is a sensor detecting an extremely minute pressure.

Application Example 3

This application example is directed to the MEMS element according to the application example described above, wherein the flexible portion and the fixation end are separated from each other in a plan view of the principal surface.

According to this application example, since the fixation end of the movable electrode is positioned outside the region of the flexible portion, the movable electrode is not influenced by the bending deformation of the flexible portion, and the bending deformation of the flexible portion becomes the deformation of the fixation electrode and changes the gap. Accordingly, design calculation of a change amount of the gap due to the pressure of the external load or pressure detection adjustment in the manufacturing process of the MEMS element can be easily performed, and the MEMS element capable of correctly detecting the pressure can be obtained.

Application Example 4

This application example is directed to the MEMS element according to the application example described above, wherein the flexible portion is a polygon in a plan view of the principal surface.

According to this application example, the position of the peak of the bending deformation of the flexible portion due to the pressure of the external load is positioned in the vicinity of the centroid of the polygonal planar shape. Accordingly, the design calculation of the change amount of the gap due to the pressure of the external load or pressure detection adjustment in the manufacturing process of the MEMS element can be easily performed, and the MEMS element capable of correctly detecting the pressure can be obtained.

Application Example 5

This application example is directed to the MEMS element according to the application example described above, wherein a planar shape of the flexible portion is a circle in a plan view of the principal surface.

According to this application example, the position of the peak of the bending deformation of the flexible portion due to the pressure of the external load is positioned in the vicinity of the center of the circular planar shape. Accordingly, the design calculation of the change amount of the gap due to the pressure of the external load or pressure detection adjustment in the manufacturing process of the MEMS element can be easily performed, and the MEMS element capable of correctly detecting the pressure can be obtained.

Application Example 6

This application example is directed to the MEMS element according to the application example described above, wherein the flexible portion is a bottom portion of a concave portion which is provided on the substrate.

According to this application example, the flexible portion can be easily formed by only forming the concave portion on the substrate. Moreover, a thickness of a thin portion can be easily adjusted by adjusting a depth of the concave portion, and thus, it is possible to easily obtain a MEMS element in accordance with the level of external pressure to be detected.

Application Example 7

This application example is directed to the MEMS element according to the application example described above, wherein the flexible portion is a bottom portion of a concave portion which is provided on a rear surface side having a front-rear surface relationship with the principal surface of the substrate.

According to this application example, since the concave portion is formed on the rear surface side of the substrate wafer on which the resonator is not formed in the substrate, a complex manufacturing process is not needed, and the flexible portion can be easily formed. In addition, the thickness of the thin portion can be easily adjusted by adjusting the depth of the concave portion, and thus, it is possible to easily obtain a MEMS element in accordance with the level of external pressure to be detected.

Application Example 8

This application example is directed to the MEMS element according to the application example described above, wherein the substrate has a layer including a principal surface, and internal stress of the layer is tensile stress.

For example, as a semiconductor material, silicon is used in the wafer substrate which configures the substrate, and oxygen is implanted to the silicon substrate and expands the substrate. However, according to the application example, when the substrate, which is a main body of the wafer substrate portion, is removed to form the concave portion, the concave portion is shrunk by the expansion of the silicon substrate, occurrence of wavelike wrinkles in the thin portion is suppressed, and the thin portion can be maintained in a flat plate shape. Accordingly, damage to the MEMS element due to the wrinkles is prevented, and it is possible to suppress a diaphragm from being abnormally deformed due to the pressure.

Application Example 9

This application example is directed to the MEMS element according to the application example described above, wherein the MEMS element further includes a semiconductor device.

According to this application example, since the MEMS element can be manufactured by the same manufacturing apparatus and method as the manufacturing apparatus and method of a semiconductor device, that is, a so-called IC, the MEMS element and the IC can be easily integrated while realizing reduction in the manufacturing cost and reduction in environmental load, and thus, a small-sized MEMS element including an oscillation circuit can be obtained.

Application Example 10

This application example is directed to an electronic device including: the above-described MEMS element; and a holding unit which exposes and holds the substrate of the MEMS element to a pressure variation region. The flexible portion is exposed to the pressure variation region.

According to this application example, bending is generated in the flexible portion by applying external pressure to the flexible portion, and a vibration characteristic of the resonator, that is, a resonant frequency is changed. By deriving a relationship between the external pressure and the change of the frequency characteristic of the resonator, the pressure sensor can be obtained, which is the electronic device detecting the external pressure from the change of the frequency characteristic of the resonator.

Application Example 11

This application example is directed to an altimeter including: the above-described MEMS element; a holding unit which exposes the substrate of the MEMS element to a pressure measurement target region, and exposes the flexible portion to the pressure measurement target region and holds the flexible portion; and a data processing unit which processes measurement data of the MEMS element.

According to this application example, bending is generated in the flexible portion by applying external pressure to the flexible portion, and a vibration characteristic of the resonator, that is, the resonant frequency is changed. By deriving a relationship between the external pressure and the change of the frequency characteristic of the resonator, an altimeter is obtained, which detects the external pressure from the change of the frequency characteristic of the resonator and can calculate altitude from the pressure value.

Application Example 12

This application example is directed to an electronic apparatus including the above-described MEMS element, an electronic device, or an altimeter.

According to this application example, a pressure value having extremely low pressure is obtained, and an electronic apparatus, which is operated based on the pressure value, can be obtained.

Application Example 13

This application example is directed to a moving object including the above-described MEMS element, an electronic device, an altimeter, or an electronic apparatus.

According to this application example, a pressure value having extremely low pressure is obtained, and a moving object including the electronic apparatus, which is operated based on the pressure value, can be obtained.

BRIEF DESCRIPTION OF THE DRAWINGS

The invention will be described with reference to the accompanying drawings, wherein like numbers reference like elements.

FIG. 1A is a schematic cross-sectional view, and FIG. 1B is a plan view of a MEMS vibrator portion.

FIG. 3A is a schematic cross-sectional view, and FIGS. 3B and 3C are schematic plan views.

FIG. 6A is a configuration view, and FIG. 6B is an enlarged view of an E portion shown in FIG. 6A.

DESCRIPTION OF EXEMPLARY EMBODIMENTS

Hereinafter, embodiments will be described with reference to the drawings.

First Embodiment

Figure 1A:
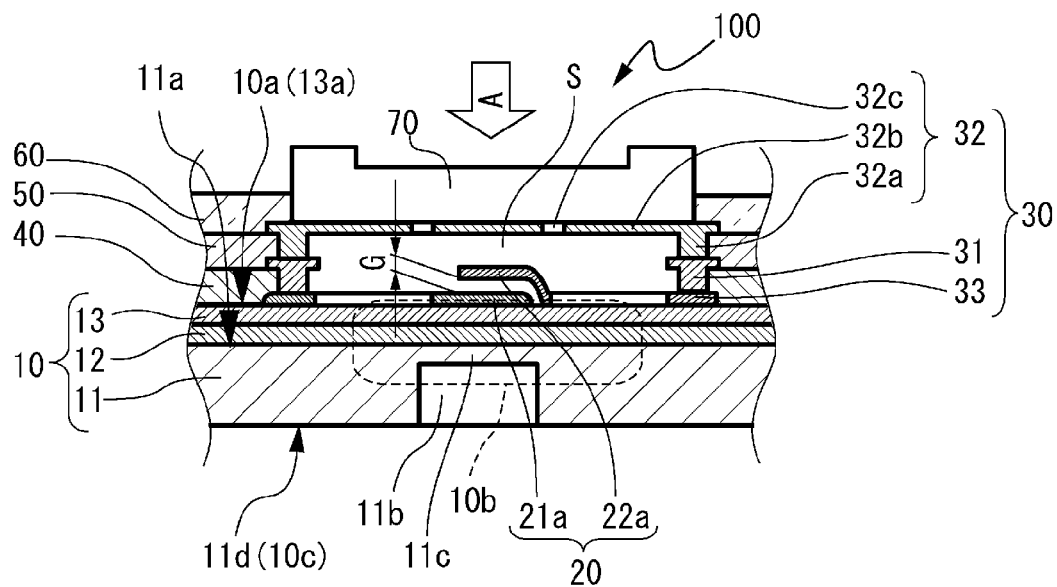
FIGS. 1A and 1B show a MEMS element according to a first embodiment.
Figure 1B:
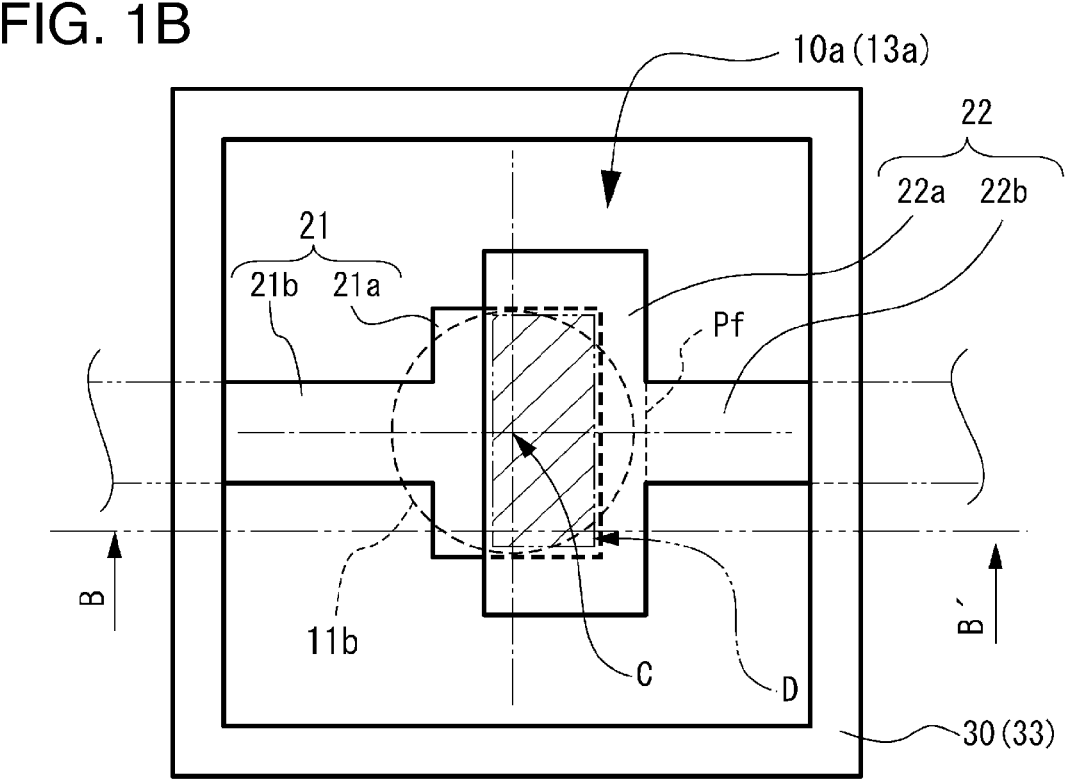

FIGS. 1A and 1B show a MEMS element according to a first embodiment, FIG. 1A is a schematic cross-sectional view, and FIG. 1B is a plan view in which a coating layer described below is transmitted when viewed from an A direction of an electrode portion shown in FIG. 1A. In addition, FIG. 1A is a cross-sectional view corresponding to a B-B' portion shown in FIG. 1B. As shown in FIG. 1A, a MEMS element 100 according to the embodiment includes a substrate 10 configured of a wafer substrate 11, a first oxide film 12 which is formed on a principal surface 11a of the wafer substrate 11, and a nitride film 13 which is formed on the first oxide film 12. The wafer substrate 11 is a silicon substrate and is also used as the wafer substrate 11 which forms a semiconductor device described below, that is, a so-called IC.

A MEMS vibrator 20, which is a resonator, is formed on the principal surface 10a which is a first surface of the substrate 10, that is, a surface 13a of the nitride film 13. As shown in FIG. 1B, the MEMS vibrator 20 is configured of a lower fixation electrode 21a (hereinafter, referred to as a lower electrode 21a) included in a first conductive layer 21 and a movable electrode 22a (hereinafter, referred to as an upper electrode 22a) included in a second conductive layer 22. As shown in FIG. 1B, the first conductive layer 21 includes the lower electrode 21a and a first wiring portion 21b which is connected to an external wiring (not shown). Moreover, the second conductive layer 22 includes the upper electrode 22a and a second wiring portion 22b which is connected to the external wiring (not shown). The first conductive layer 21 and the second conductive layer 22 are formed by patterning conductive polysilicon through photolithography. In addition, the example, in which the first conductive layer 21 and the second conductive layer 22 use polysilicon, is described in the embodiment. However, the invention is not limited to this.

In the MEMS vibrator 20, the gap G is formed between the lower electrode 21a and the upper electrode 22a, and the gap is a space in which the upper electrode 22a can move. Moreover, the MEMS vibrators 20 is formed so as to be accommodated in a space portion S which is formed on the principal surface 10a of the substrate 10. The space portion S is formed as follows. After the first conductive layer 21 and the second conductive layer 22 are formed, the second oxide film 40 is formed. In the second oxide film 40, the second conductive layer 22 is formed, and at the same time, a hole, to which an undermost layer 33 is exposed, is formed of polysilicon so as to be connected to the undermost layer 33 of a space wall portion 30 described below, and a first wiring layer 31 is formed by patterning through photolithography.

Moreover, a third oxide film 50 is formed on the second oxide film 40. In the third oxide film 50, a hole, to which the first wiring layer 31 is exposed, is formed, and a second wiring layer 32 is formed by the patterning through the photolithography. The second wiring layer 32 includes a wall portion 32a which configures the uppermost layer of the space wall portion 30 described below, and a cover portion 32b which configures the space S receiving the MEMS vibrator 20. In addition, the cover portion 32b of the second wiring layer 32 includes an opening 32c for performing release etching on the second oxide film 40 and the third oxide film 50 which are formed in the manufacturing process for forming the space S and are positioned in the region of the space S.

Next, a protective film 60 is formed to expose the opening 32c of the second wiring layer 32, an etchant, which etches the second oxide film 40 and the third oxide film 50, is introduced from the opening 32c, and the space S is formed by the release etching. The space S is a region which is enclosed by the space wall portions 30 which are formed of the undermost layer 33, the first wiring layer 31, and the second wiring layer 32.

The gap G provided in the MEMS vibrator 20 is formed by the release etching when the space S is formed as described above. That is, after the first conductive layer 21 is formed, a fourth oxide film (not shown) is formed on the lower electrode 21a, and the upper electrode 22a is formed on the fourth oxide film. Moreover, the fourth oxide film is removed along with the second oxide film 40 and the third oxide film 50 by the release etching, and thus, the gap G is formed. In addition, the second oxide film 40 and the third oxide film 50 of the region corresponding to the space S removed by the above-described release etching, and the fourth oxide film are referred to as sacrifice layers.

If the release etching ends and the space S is formed, a coating layer 70 is formed and covers the cover portion 32b of the second wiring layer 32 which is not covered by the protective film 60, and the opening 32c is sealed. Accordingly, the space S is closed.

In this way, the MEMS element 100 is formed. In the MEMS element 100 according to the embodiment, a concave portion 11b is formed on a wafer substrate rear surface 11d of the wafer substrate 11, which becomes a substrate rear surface 10c as a second surface which is a surface opposite to the principal surface 10a of the substrate 10 corresponding to the MEMS vibrator 20. The concave portion 11b is formed, and thus, a thin portion 11c is formed in the region of the principal surface 10a on which the MEMS vibrator 20 is formed. That is, the bottom portion of the concave portion 11b becomes the thin portion 11c. A flexible portion 10b is configured of the thin portion 11c, the first oxide film. 12 formed on the thin portion 11c, and the nitride film 13.

As shown in FIG. 1B, the concave portion 11b forming the flexible portion 10b of the MEMS element 100 according to the embodiment has a circular plane shape, that is, configures the columnar concave portion 11b. The plane region of the concave portion 11b, which becomes a planar shape when the flexible portion 10b is viewed from the A direction, is formed in a range of the inner region of the space wall portion 30. More preferably, as shown in FIG. 1B, a center C of the plane region of the concave portion 11b which becomes the planar shape when viewed from the A direction exists in a D region in which the lower electrode 21a and the upper electrode 22a overlap with each other when viewed from the A direction, and the plane region of the concave portion 11b, which becomes the planar shape when viewed from the A direction, does not overlap with a fixation end Pf of the upper electrode 22a.

Figure 2A:
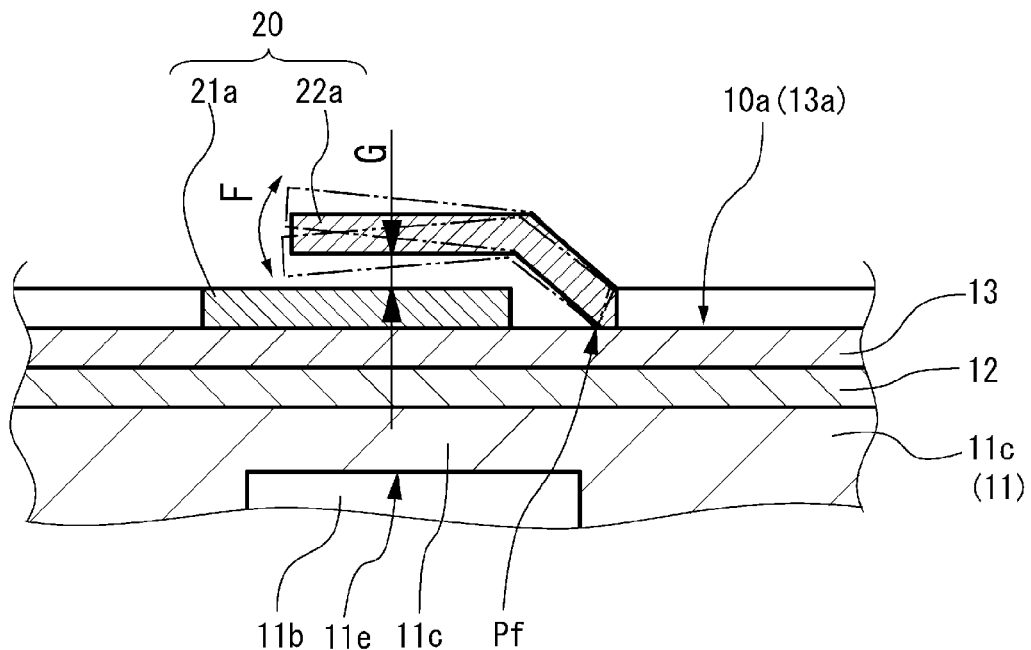
FIG. 2A is a cross-sectional schematic view showing a steady state of the MEMS element according to the first embodiment and FIG. 2B is a cross-sectional schematic view of the MEMS vibrator portion for explaining an operation in a pressurized state.
Figure 2B:
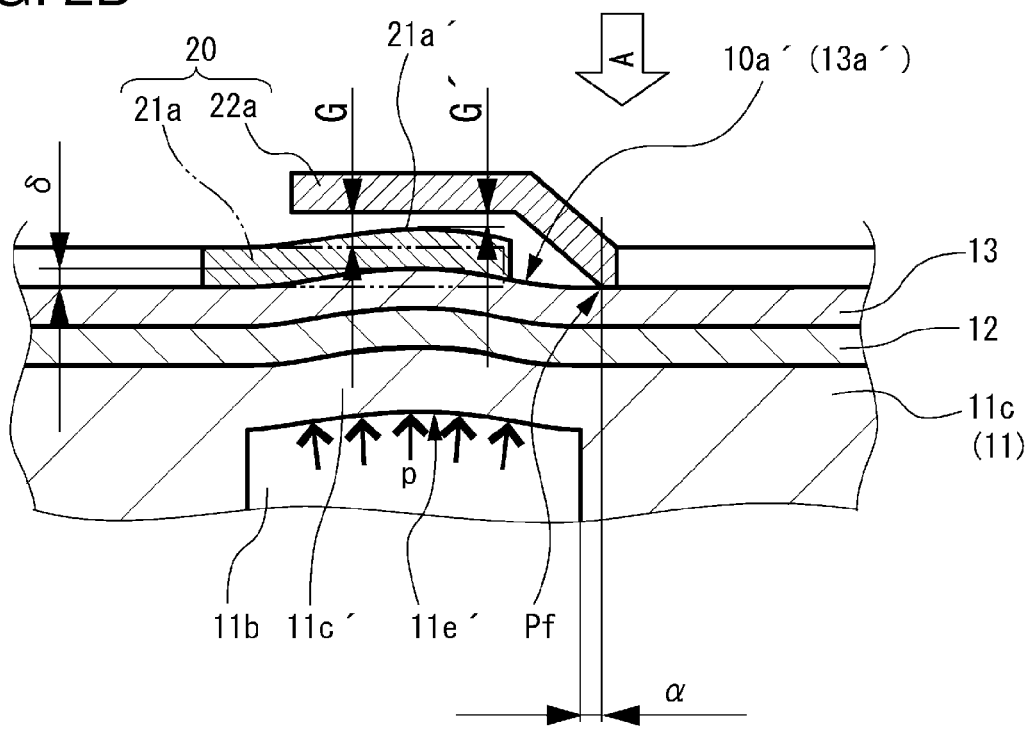

In the MEMS element 100 according to the embodiment, in the MEMS element 100 including the flexible portion 10b, the bending is generated in the flexible portion 10b by an external factor, particularly, an external force such as pressure, and thus, vibration frequency characteristics of the MEMS vibrator 20 are changed. This mechanism will be described with reference to FIGS. 2A and 2B. FIG. 2A is an enlarged cross-sectional schematic view of the B-B' portion shown in FIG. 1B of the MEMS vibrator 20 in a steady state of the MEMS element 100 shown in FIG. 1A, and FIG. 2B is an enlarged cross-sectional schematic view showing the MEMS vibrator 20 of the MEMS element 100 in a state where the external force is applied to the steady state shown in FIG. 2A.

As shown in FIG. 2A, in the MEMS vibrator 20 in the steady state, the upper electrode 22a is disposed to be separated from the lower electrode 21a with the gap G. The upper electrode 22a is a cantilever which has the junction point Pf between the principal surface 10a of the substrate 10 and the upper electrode as a fixed point. An electrostatic force, which is generated by electrical charges applied to the lower electrode 21a and the upper electrode 22a, vibrates the upper electrode 22a in an F direction. Moreover, by detecting a change of capacitance of the gap G, the vibration characteristic such as the vibration frequency of the MEMS vibrator 20 can be obtained.

In the MEMS element 100 including the MEMS vibrator 20 which can be vibrated as described above, as shown in FIG. 2B, pressure P is applied to the concave portion 11b of the wafer substrate 11 as the external force, and stress is applied to the thin portion 11c, the first oxide film 12, and the nitride film 13 which configures the flexible portion 10b by the pressure p applied to a concave portion substrate surface 11e of the concave portion 11b. Accordingly, the principal surface 10a of the substrate 10 is deformed and becomes a principal surface 10a', and bending δ is generated. As described above, the upper electrode 22a is positioned so that the concave portion 11b does not overlap with the fixation end Pf of the upper electrode 22a when viewed from the A direction, that is, the concave portion 11b is separated from the fixation end Pf by α(α≥0) when viewed from the A direction. Accordingly, bending is not generated in the principal surface 10a, on which the fixation end Pf is formed, by the pressure p. As a result, the gap G of the MEMS vibrator 20 is changed to a gap G' between the fixation electrode 21a' and the movable electrode 22a which are displaced by the bending δ, and is decreased. According to the change from the gap G to the gap G', vibration characteristics of the MEMS vibrator 20 are changed.

In this way, by deriving a relationship between the external pressure p which generates the change of the gap amount from the gap G to the gap G' and the change of the frequency characteristic of the MEMS vibrator 20, the MEMS element 100 can be used as a sensor which detects the pressure p, which is the external pressure, from the change of the frequency characteristic of the MEMS vibrator 20. Moreover, in a design of the thin portion 11c of the wafer substrate 11, in a state where uniform pressure is applied to a so-called outer circumference fixed flat plate in the thin portion 11c, calculation of the bending amount can be easily performed. Accordingly, the thickness of the thin portion 11c of the MEMS element 100 can be easily designed with respect to the detected pressure specification. In addition, also in a manufacturing process, since a relationship between an amount of thickness adjustment of the thin portion 11c and an adjustment amount of the detected pressure can be easily estimated, the adjustment in the manufacturing process is easily performed, and thus, the MEMS element which can correctly detect the pressure can be obtained.

Figure 3A:
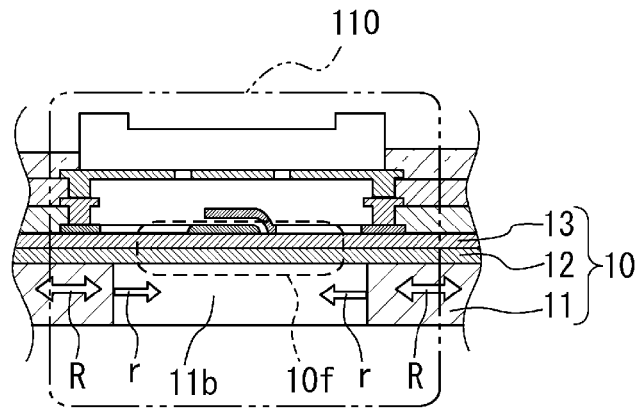
FIGS. 3A to 3C show the MEMS element having another configuration.
Figure 3B:
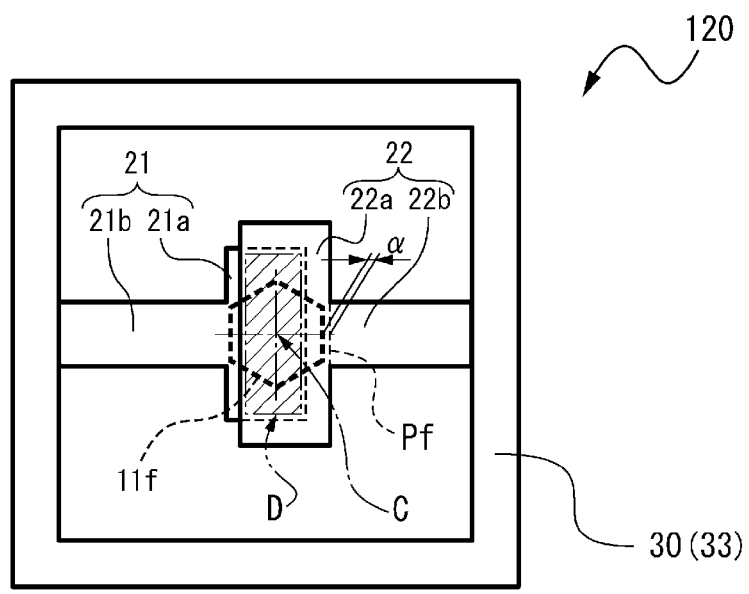
Figure 3C:
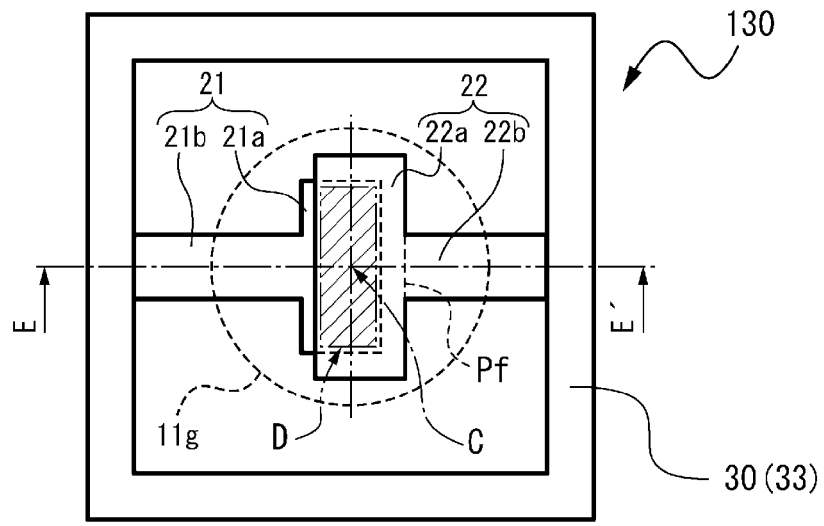

FIGS. 3A to 3C show another configuration of the concave portion 11b. In a MEMS element 110 shown in FIG. 3A, the concave portion 11b to which the first oxide film 12 is exposed is formed in the wafer substrate 11, and a flexible portion 10f is formed of the first oxide film 12 and the nitride film 13. In the MEMS element 110, as described above, the wafer substrate 11 is a silicon substrate, oxygen is implanted into the inner portion of the substrate, and the wafer substrate 11 itself generates stress which expands in an R direction shown in FIG. 3A. In addition, the concave portion 11b shrinks in an arrow r direction shown in FIG. 3A according to the stress expanding in the R direction of the wafer substrate 11. The flexible portion 10f is also shrunk by the shrinkage in the r direction, and thus, wrinkled or wavelike deformation occurs. However, since the nitride film 13 is formed so that tensile stress remains in the inner portion of the nitride film, the deformation due to the shrinkage of the flexible portion 10f is canceled by the tensile stress flowing in the inner portion of the nitride film 13, and thus, occurrence of the wrinkled or wavelike deformation can be suppressed.

Accordingly, even when the flexible portion 10f is configured of the nitride film 13 and the first oxide film 12 as shown in FIG. 3A, the flexible portion 10f in which the deformation is suppressed even with the thinner thickness can be formed, and thus, the MEMS element 110 capable of detecting minute pressure can be obtained. Moreover, the film formed of the nitride film 13 is not limited to the nitride film as long as the tensile stress remains in the inner portion of the film.

In a MEMS element 120 shown in FIG. 3B, the planar shape of the concave portion 11b in the MEMS element 100 is formed of a polygon, and particularly, the planar shape is formed in a hexagon which is an example of the polygon. As shown in FIG. 3B, also in a concave portion 11f including the hexagonal planar shape, it is preferable that the center C which is the centeroid of the hexagon in the planar shape of the concave portion 11f be positioned in the region D in which the lower electrode 21a and the upper electrode 22a overlap with each other, and the concave portion 11f be formed so as to be separated by α from the fixation end Pf of the upper electrode 22a. Moreover, the planar shape of the concave portion 11f is not limited to the hexagon. In addition, when the concave portion 11f has a polygonal planar shape, it is preferable that the planar shape be a regular polygon.

In a MEMS element 130 shown in FIG. 3C, the formation region of the concave portion 11b in the MEMS element 100 is enlarged. As shown in FIG. 3C, the planar shape of a concave portion 11g included in the MEMS element 130 is formed in a circle, and is disposed so that the fixation end Pf of the upper electrode 22a is included in the region of the concave portion 11g. Moreover, the center C of the circular planar shape of the concave portion 11g is disposed in the region D in which the lower electrode 21a and the upper electrode 22a overlap with each other. The concave portion 11g of the MEMS element 130 is disposed in at least the inner region of the space wall portion 30 which configures the space S (refer to FIGS. 1A and 1B). In the case of the concave portion 11g configured as described above, the bending of the flexible portion 10b, which is generated by an external force such as pressure which is an external factor, generates a behavior shown in FIG. 4.

Figure 4:
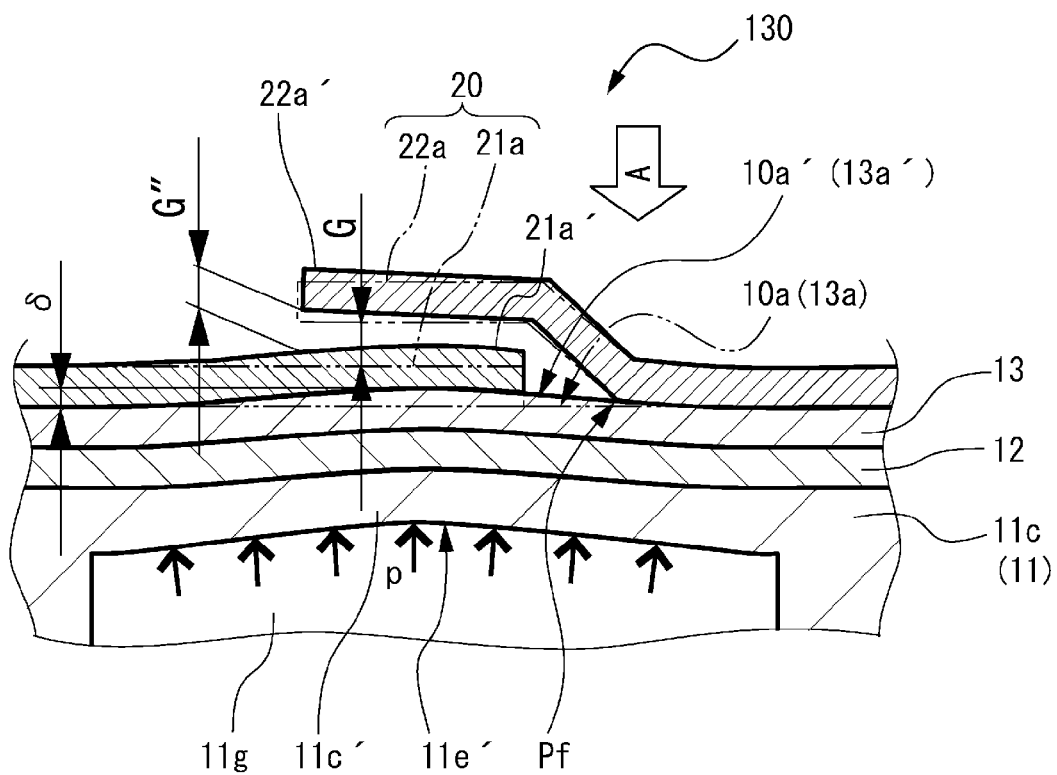
FIG. 4 is a cross-sectional schematic view showing a MEMS vibrator portion having another configuration in the MEMS element according to the first embodiment.

FIG. 4 is a cross-sectional view showing an E-E' portion in a state where the pressure p is applied to the MEMS element 130 shown in FIG. 3C. As shown in FIG. 4, the concave portion 11f is formed so that the fixation end Pf of the upper electrode 22a is positioned in the formation region of the concave portion 11g when viewed from the A direction. The pressure p is applied to the concave portion 11g, the concave portion substrate surface 11e (refer to FIGS. 2A and 2B) is pressed and deformed in a pressure p direction (an arrow direction shown in FIG. 4) by the pressure p, the principal surface 10a is deformed and becomes the principal surface 10a', and the bending δ is generated. In addition, the fixation end Pf of the upper electrode 22a also becomes the region of the deformed principal surface 10a', and the upper electrode 22a moves along the surface shape of the deformed principal surface 10a' and is positioned at the position of the moved upper electrode 22a'.

The gap G is changed to a gap G" by the fixation electrode 21a' displaced due to the bending δ of the principal surface and the movement amount from the upper electrode 22a to the moved upper electrode 22a'. According to the change from the gap G to the gap G", the vibration characteristic of the MEMS vibrator 20 is changed. According to a relationship between the pressure p and the change of the frequency characteristic of the MEMS vibrator 20, the MEMS element 130 can be used as a sensor which detects the pressure p, which is the external pressure, from the change of the frequency characteristic of the MEMS vibrator 20.

Figure 5:
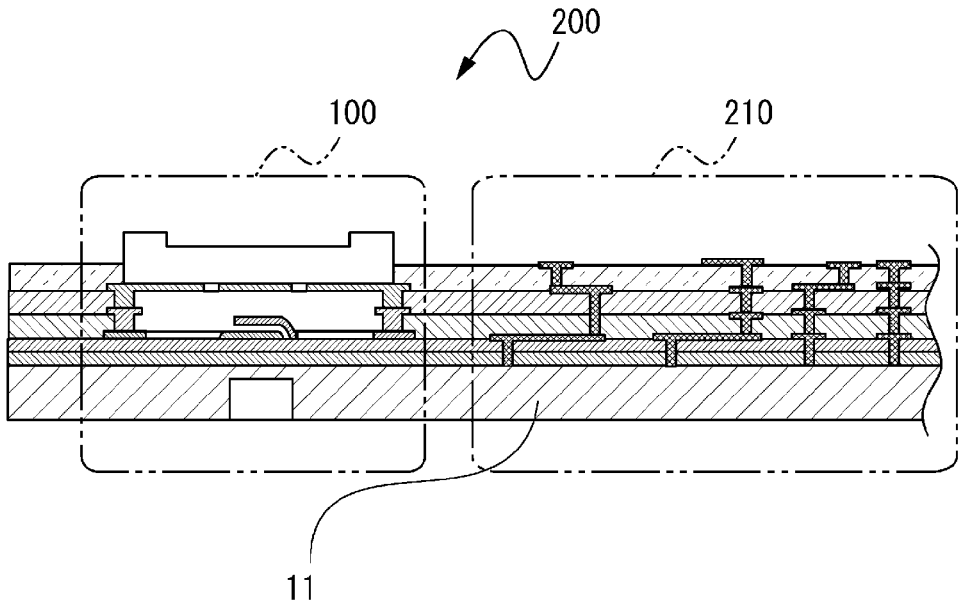
FIG. 5 is a cross-sectional view showing a MEMS element having still another configuration.

FIG. 5 shows a configuration in which the above-described MEMS element 100 and a semiconductor device are configured in one chip. A MEMS element 200 shown in FIG. 5 includes a configuration in which the MEMS element 100 and a semiconductor device 210 are formed in one chip. Since the MEMS element 100 is a micro device which can be manufactured by a semiconductor manufacturing method using a semiconductor manufacturing apparatus, the semiconductor device 210 can be easily formed on the same wafer substrate 11 as the MEMS element 100. The semiconductor device 210 includes an oscillation circuit which drives the MEMS element 100 and a calculation circuit which calculates the frequency variation of the MEMS element 100, or the like. As shown in the MEMS element 200, the semiconductor device 210 is formed in one chip along with the MEMS element 100, and thus, the MEMS element which is a small-sized sensor device can be obtained.

Second Embodiment

As a second embodiment, an altimeter will be described with reference to the drawings. The altimeter according to the second embodiment is one form of an electronic apparatus including a pressure sensor which is an electronic device having the MEMS elements 100 and 200 according to the first embodiment.

Figure 6:
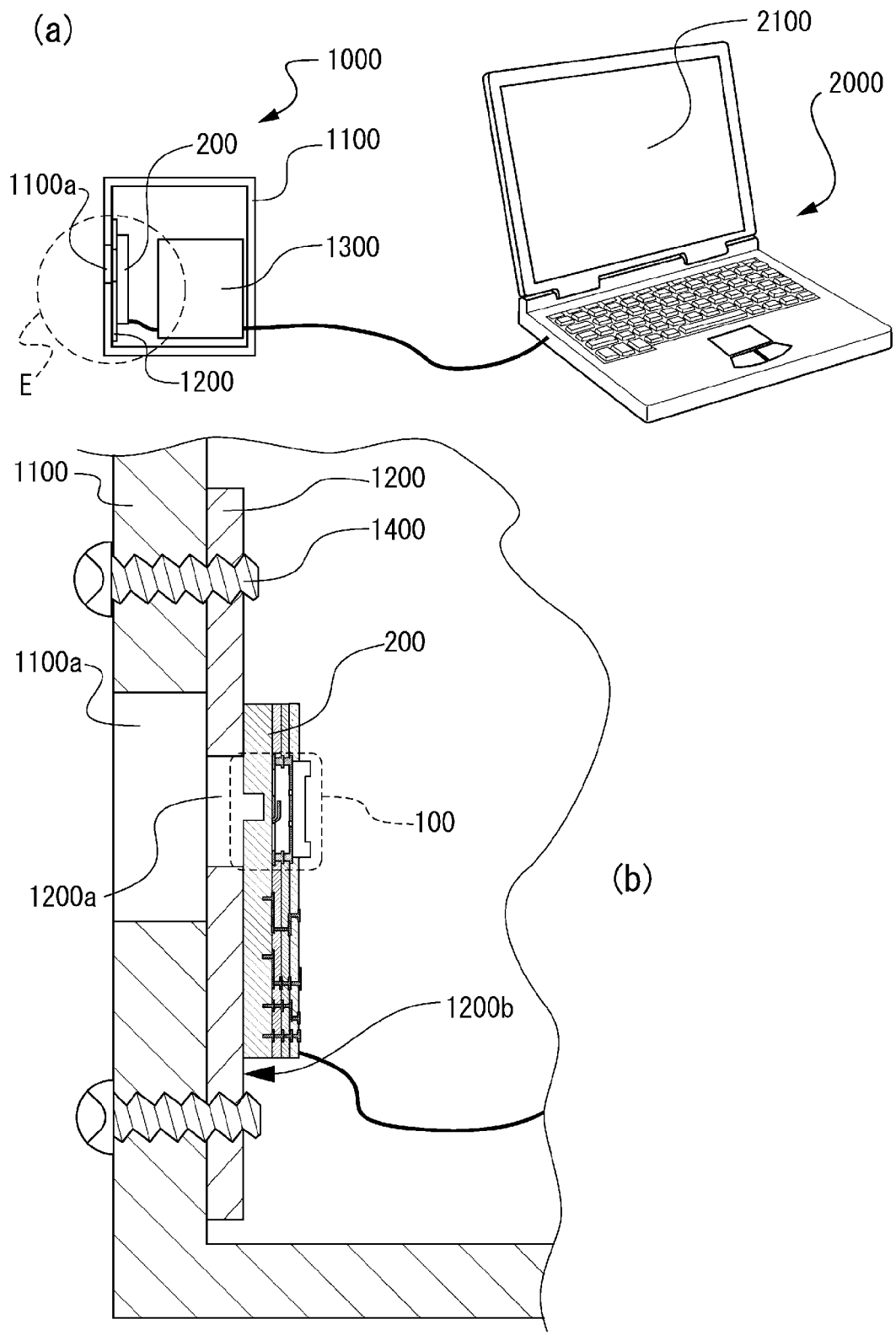
FIGS. 6A and 6B show an altimeter according to a second embodiment.

As shown in FIG. 6A, an altimeter 1000 according to the second embodiment includes the MEMS element 200 according to the first embodiment, an element fixation frame 1200 which is a holding unit mounted on a housing 1100 to hold the MEMS element 200, and a calculation unit 1300 which calculates altitude data from the data signal obtained from the MEMS element 200, in the housing 1100. In the housing 1100, an opening 1100a is provided, through which the flexible portion 10b (refer to FIGS. 1A and 1B) of the MEMS element 100, which is included in the MEMS element 200, can be ventilated by the atmosphere.

An E portion shown in FIG. 6A, that is, the detail in the cross-section of the mounting portion of the MEMS element 200 is shown in FIG. 6B. As shown in FIG. 6B, the flexible portion 10b of the MEMS element 100 is disposed to be exposed to the opening 1100a side. Moreover, the element fixation frame 1200 also includes a through hole 1200a, and the through hole 1200a is also disposed so that the flexible portion 10b of the MEMS element 100 is exposed. The element fixation frame 1200 and the MEMS element 200 are joined to a joint surface 1200b of the element fixation frame 1200 by a unit such as adhesion. The element fixation frame 1200, to which the MEMS element 200 is joined, is mounted on the housing 1100 by a screw 1400. Moreover, the fixation method of the element fixation frame 1200 to the housing is not limited to the screw 1400, and a fixation unit such as adhesion may be used.

In the altimeter 1000, the pressure variation region, which is applied to the flexible portion 10b of the MEMS element 100 which is ventilated through the opening 1100a of the housing 1100 and the through hole 1200a of the element fixation frame 1200, is ventilated by the atmosphere, pressure of the atmosphere (hereinafter, referred to as atmospheric pressure) is detected, and altitude data is output. The output altitude data is sent to a personal computer 2000 (hereinafter, referred to as a PC 2000) including a display unit 2100 shown in FIG. 6A, and is displayed on the display unit 2100 of the PC 2000. At this time, various data processes such as storage of the altitude data, graphing, or display to map data can be performed by the processing software included in the PC 2000. Moreover, instead of the PC 2000, a data processor, a display unit, an external operation unit, or the like may be included in the altimeter 1000.

Figure 7:
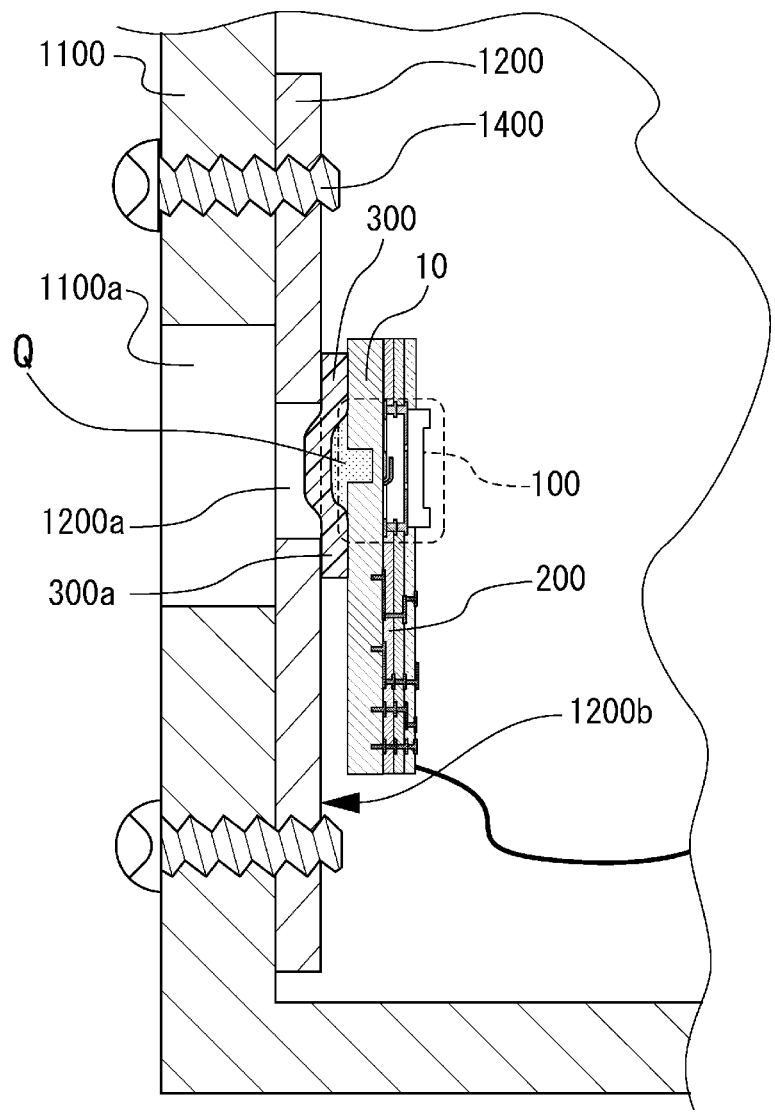
FIG. 7 is a partial cross-sectional view showing the altimeter having another configuration.

FIG. 7 shows another configuration of the MEMS element 200 which is included in the altimeter 1000 according to the second embodiment. FIG. 7 shows the E portion of FIG. 6A of the altimeter 1000 shown in FIG. 6A. As shown in FIG. 7, in the MEMS element 200, a flexible film 300 having flexibility and air tightness is fixed to the MEMS element 200. For example, as the flexible film 300, a material such as a fluororesin or a synthetic rubber having elasticity and low gas permeability, or a metal thin film is preferable.

The flexible film 300 is disposed to cover the flexible portion 10b of the MEMS element 100, and is fixed to the substrate 10 by a flange portion 300a. At this time, for example, gas such as air or inert gas is filled in a space Q (shown in a dotted hatching section) which is formed by the substrate 10 and the flexible film 300, and the space is formed as a pressure variation region. The MEMS element 200 having the flexible film 300 is fixed to the element fixation frame 1200 and is mounted on the housing 1100.

Since the MEMS element 200 includes the flexible film 300, it is possible to prevent foreign matters, dust, or the like from being attached to the MEMS element 100 from the outside, the MEMS elements can be cleanly maintained, and thus, stable performance of the altimeter can be obtained. In addition, even when the external environment of the flexible film 300 is liquid, corrosion gas, or the like, damage of the MEMS element 200 can be suppressed.

Third Embodiment

A navigation system which is an electronic apparatus having the MEMS elements 100 and 200 according to the first embodiment or the altimeter 1000 according to the second embodiment, and a vehicle which is an aspect of a moving object on which the navigation system is mounted will be described.

Figure 8:
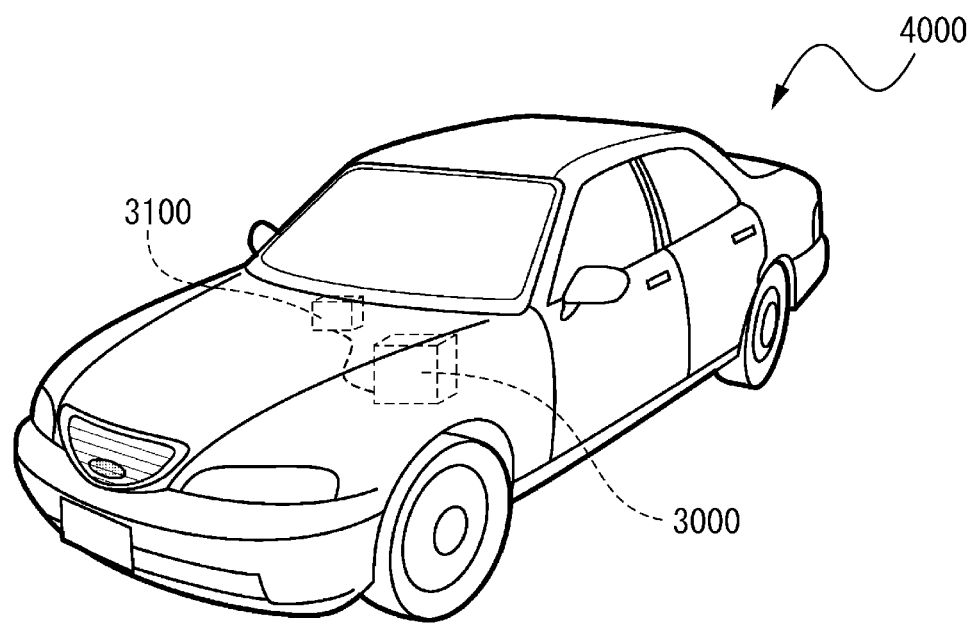
FIG. 8 is an outline view showing a moving object according to a third embodiment.

FIG. 8 is an outline view of a vehicle 4000 which is the moving object including a navigation system 3000 as the electronic apparatus. The navigation system 3000 includes map information (not shown), a position information acquisition unit from a Global Positioning System (GPS), a self-contained navigation unit configured of a gyro sensor, an acceleration sensor, and vehicle speed data, and the altimeter 1000 according to the second embodiment, and displays the information in a predetermined position or road information on a display unit 3100 disposed at a position which can be viewed by a driver.

Since the altimeter 1000 is included in the navigation system 3000 in the vehicle 4000 shown in FIG. 8, altitude information can be obtained in addition to the obtained positional information. For example, when the vehicle runs on an elevated road at approximately the same position as a general road in the positional information, in a case where the altitude information is not provided, whether or not the vehicle runs on the general road or an elevated road cannot be determined by the navigation system, and the information of the general road is supplied to the driver as preferential information. Accordingly, since the altitude information can be obtained by the altimeter 1000 in the navigation system 3000 according to the embodiment, an altitude change is detected according to the vehicle entering from the general road to the elevated road, and thus, the navigation information in the running state of the elevated road can be supplied to the driver.

In addition, it is possible to configure a small-sized pressure detection apparatus by the MEMS elements 100 and 200 according to the first embodiment, and a drive system of oil pressure or air pressure can be easily incorporated to the vehicle 4000. Accordingly, observation of the pressure in the apparatus and control data can be easily obtained.

The entire disclosure of Japanese Patent Application No. 2012-270078, filed Dec. 11, 2012 is expressly incorporated by reference herein.

What is claimed is:

1. A MEMS element comprising:
   a substrate that has first and second surfaces opposite to each other, a flexible recess portion being provided in the second surface of the substrate so that thicknesses of the substrate is different between the flexible recess portion and the other portions;
   a fixation electrode which is provided on the first surface of the substrate; and
   a movable electrode that is in a cantilever shape having a fixation end and a movable portion continuously connected to each other, the fixation end being provided on the first surface of the substrate, the movable portion being separated from the fixation electrode by a gap, the movable portion overlapping with at least a portion of the fixation electrode in a plan view of the first surface, and the fixation end being laterally shifted from the fixation electrode in the plan view,
   wherein a center of a bottom of the flexible recess portion, the fixation electrode and the movable electrode are overlapped with each other in the plan view,
   a width of the movable portion of the movable electrode is larger than a width of the fixation electrode at a location above the center of the flexible recess portion in the plan view, and
   an electrostatic force, which is generated by electrical charges applied to the fixation electrode and the movable electrode, vibrates the movable electrode.

2. The MEMS element according to claim 1, wherein the flexible recess portion and the fixation end are laterally shifted from each other in the plan view.

3. The MEMS element according to claim 1, wherein the flexible recess portion is a polygon in the plan view.

4. The MEMS element according to claim 1, wherein the bottom of the flexible recess portion is in a circular shape in the plan view.

5. The MEMS element according to claim 1, wherein the substrate is configured with a stacked layer including a layer having the first surface, and internal stress of the layer is tensile stress.

6. An electronic device comprising:
   the MEMS element according to claim 1; and
   a holding unit which exposes and holds the substrate of the MEMS element to a pressure variation region,
   wherein the flexible recess portion is exposed to the pressure variation region.

7. An altimeter comprising:
   the MEMS element according to claim 1;
   a holding unit which exposes the substrate of the MEMS element to a pressure measurement target region, and exposes the flexible recess portion to the pressure measurement target region and holds the flexible recess portion; and
   a data processing unit which processes measurement data of the MEMS element.

* * * * *